April 13, 1943.   H. JAFFA   2,316,695

THEFT PREVENTION DEVICE

Filed Jan. 29, 1942

INVENTOR
HARRY JAFFA
By Paul, Paul & Moore
ATTORNEYS

Patented Apr. 13, 1943

2,316,695

UNITED STATES PATENT OFFICE 2,316,695

THEFT PREVENTION DEVICE

Harry Jaffa, Minneapolis, Minn.

Application January 29, 1942, Serial No. 428,743

13 Claims. (Cl. 85—32)

This invention relates to a locking device for preventing the unwarranted removal of tires from automotive wheels and is directed particularly to devices for preventing theft of tires on demountable wheels or demountable rims.

It is an object of the invention to provide a locking device for immovably retaining the tire mounting with provision for allowing the ready removal by use of a key or tool.

It is a further object of the invention to provide a lug for retaining a demountable tire carrying rim in which the lug is retained by a normal nut or burr, the latter in turn being protected from removal by an enclosure which can be conveniently opened only with an especially fitted tool or key.

It is a further object of the invention to provide a neat, close-fitting theft prevention lug capable of being easily manufactured or fabricated from available materials.

It is a further object of the invention to provide a tire retaining device having a simple locking device protected from accumulations of ice and sediment during the use of the automotive vehicle.

Other and further objects of the invention are those inherent in the apparatus illustrated, described and claimed.

The invention is illustrated with reference to the drawing in which.

Figures 1, 2:
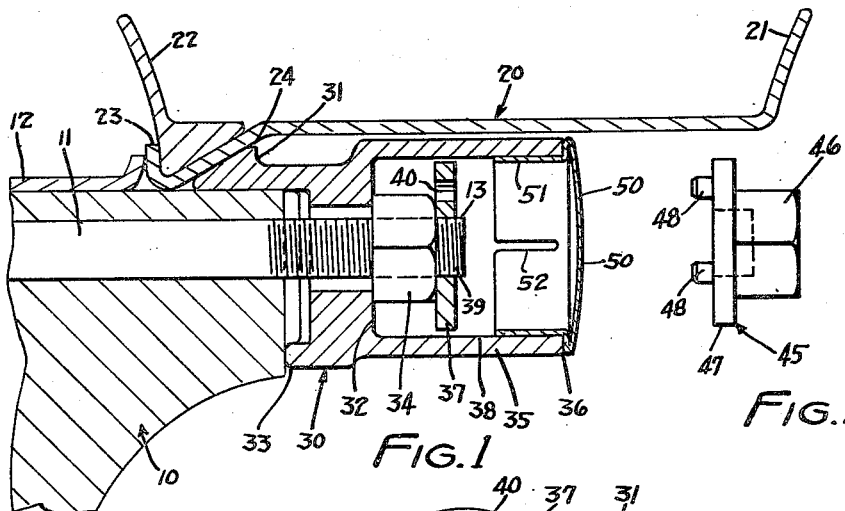
Figure 1 is an elevational view partly in section of one form of the apparatus of the present invention.
Figure 2 is a side elevational view of a key device for use in removing the lug of Figure 1.
Figure 3:
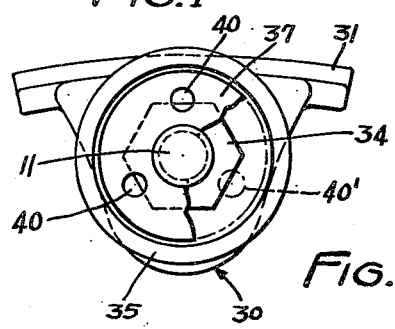
Figure 3 is a front elevational view of certain parts removed and other parts broken away illustrating the apparatus shown in Figure 1.

Referring to Figures 1, 2 and 3, there is illustrated a fragmentary section of an automotive wheel, generally designated 10, upon which a demountable tire carrying rim, generally designated 20, is adapted to be mounted. The automotive wheel is of standard type and is provided with a plurality of lug retaining studs or bolts 11, which are disposed at spaced angular positions about the wheel. In the apparatus of Figure 1, the automotive wheel 10 is adapted to mount two tires and there is a spacer rim 12 therefore provided. This engages the outer tire rim 20 and holds it in spaced relationship to another similar rim (not illustrated) also mounted upon wheel 10.

The rim 20 has a tire bead flange 21 at one side and is provided with a removable tire retaining snap ring 22, which rests in the annular channel 23 in the rim. The channel 23 is formed by rolling and presents an inclined under-surface 24 against which a usual tire retaining lug is adapted to be forced for retaining the rim on the wheel.

In the present invention, the usual tire retaining lug is replaced by the theft prevention assembly, generally designated 30, which is a combined tire retaining lug and locking device. In this instance, the lug portion of the assembly includes the wedging portion 31, shaped circumferentially to fit the tire rim, and a lock nut engaging portion 32. The portion 32 is provided with a wheel engaging tip 33 so that when the lug is placed over the stud 11 and a lock nut 34 is drawn down against the surface 32, the wedge portion 31 will be drawn into firm engagement with the under-surface 24 of the rim 20 and will retain the rim in place.

The assembly 30 also includes a deep cylindrical housing 35, which may be an integrally cast part of the assembly 30 or may be fabricated thereon. The cylindrical housing is from two to three inches deep measured from the surface 32 to the outer edge 36 so as to preclude use of any ordinary wrench upon the nut 34. The nut 34 may, however, be rotated by use of a customary socket wrench reaching down through the cylindrical housing 35. Upon the extending portion 13 of stud 11, there is threaded a disk 37, having a diameter such that it fits closely against the inner wall 38 of the cylindrical portion 35, thus covering nut 34 and preventing its being reached with a socket wrench. The disk 37 is threaded at 39 and is provided with key surfaces, here exemplified by the plurality of spaced holes 40 as shown in Figure 3. It will be noted that in Figure 3 the disk 37 is shown broken away so as to illustrate the nut 34 situated beneath it, and that the position of one of the holes 40 is illustrated in dotted lines at 40'. The holes 40 may be located in any indiscriminate manner either near or far from the center and at varying angularity. As many as several hundred separate disk patterns are thus made feasible in the disk 37 and may be of varying size. It is preferred that the holes be of relatively small diameter and that the disk be of case-hardened material such as case-hardened steel.

Rotation of the disk so as to tighten it firmly upon the nut 34 is accomplished by means of a "key," generally designated 45, having a hexagonal head 46 of the same shape as nut 34 so that it may be rotated by means of the same socket wrench that is used to rotate nut 34. The "key" 45 has a disk portion 47 and a plurality of protruding hardened steel pegs 48, which have a size and location to fit the correspondingly located holes 40 (and 40') in the disk 37. Member 45, with a particular arrangement of pegs, constitutes a "key" for rotating a particular disk 37 and having a corresponding arrangement of holes. The removal of the disk 37 is prevented, or at least, temporarily delayed unless the operator has the necessary fitted key 45 which corresponds with the particular disk in use in the apparatus.

By making the holes 40 and pegs 48 of relatively small diameter, but of exceedingly tough material, it is possible to obtain the necessary rotating force for adequately tightening down the disk 37 on the nut 34 and still prevent the ready removal of the disk by improvised tools. The deep cylindrical wall 35 prevents rotation of the disk 37 with a chisel or punch.

It will readily be perceived that other types of keyed or matched surfaces between the disk portion 47 of the key 45 and the disk 37 may be utilized, the criteria being that the interlocking surface (here illustrated by pegs 48 and holes 40) be capable of transmitting an adequate rotatory torque from the key to the disk in both tightening and loosening directions.

At the outer end of the cylindrical wall 35, there is provided a press-metal cap 50, which has an inturned flange 51 segmented by notches 52. The flange has a relaxed diameter such that force must be used for inserting the same into the cylindrical wall 35. As a result, the friction between the flange 51 and the wall 35 will retain the cap 50 in place. In this way, water and sediment are largely excluded from the interior of cylindrical wall 35 thereby preventing clogging of the holes 40 or other torque transmitting surfaces provided for rotation of disk 37. A small amount of sediment or ice does not interfere with the rotation of the simple disk lock here illustrated. In this, the simple disk lock presents distinct advantages over any ordinary pin tumbler or lever lock since in use or on an automotive wheel, there is an inevitable accumulation within the housing, if nothing more than condensed moisture. When moisture freezes in an ordinary lock, it is usually unworkable, a condition obviated by the device herein illustrated.

It may be pointed out that the assembly 30 is illustrative of the type of locking lug which may be used with a particular style of automotive rim and that for other styles of automotive rims, wheel, etc., the lug portion here illustrated by parts 31, 32 and 33 of member 30 may be varied to fit the particular style of rim or wheel being used.

Figure 4:
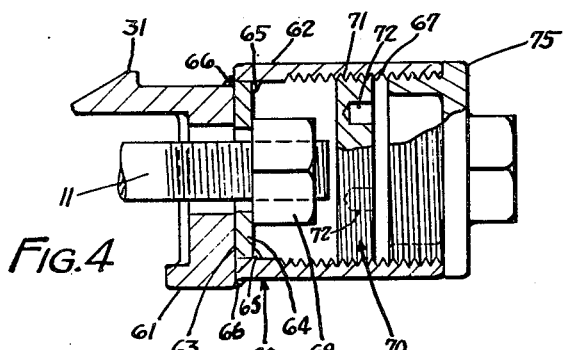
Figure 4 is a side elevational view partly in section of a modified form of the invention.
Figure 5:
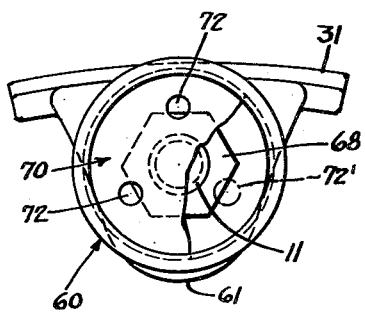
Figure 5 is a front elevational view of certain parts removed and other parts broken away of the modified apparatus shown in Figure 4.

In Figures 4 and 5, there is illustrated an assembly which may readily be fabricated from existing available materials. In this assembly, generally designated 60, there is illustrated a standard rim lug 61, to which there is welded a standard pipe coupling or length of pipe 62. Where the outer surface 63 of the rim lug has insufficient area to cover the interior cross sectional area of the coupling or piece of pipe 62, there may be inserted a punched-out steel disk 64, which is welded at 65 to the coupling or pipe 62.

Where a standard pipe coupling is used at 62 in the apparatus illustrated in Figure 4, the threads 67 provided in the coupling may be utilized for retaining a locking disk, generally designated 70. For this purpose, the disk is threaded at the edge as illustrated at 71 to fit into the interior threads 67 of the pipe coupling.

The disk 70, like disk 37, is provided with a plurality of holes 72 scattered in an indiscriminating manner over the area of the disk. In Figure 5, the disk 70 is broken away so as to expose the lug retaining nut 68. The position of one of the holes 72 of the disk is illustrated in dotted lines at location 72'. Disk 70 may be provided with any suitable surface other than holes 72 capable of being coupled with a similarly formed key of the general type shown in Figure 2 for being tightened or loosened from the disk coupling 62. When a pipe coupling is used for the member 62, the cap for excluding water and dirt may be a standard pipe fitting plug 75, although the especially designed plug shown at 75 is preferred as far as appearance is concerned and has the added advantage that it may be formed with a head nut of the same size as nut 68, thus obviating an extra wrench.

In using the apparatus of either modification, the tire mounting is held in place and the usual tire retaining lugs are applied in all, except one or two places.

The lugs 30 (or 60) are then applied and the nuts 34 (or 68) pulled down by means of a socket wrench in the usual fashion. The disk 37 (or 70) is then applied and is screwed down tightly by means of its particular "key" 45. It will be noted that the wrench head of "key" 45 will be fitted by the same socket wrench used for rotating the nut 34 (or 68) and therefore the disk 37 (or 70) may be screwed down tightly on the stud 39 or into the interior threads 67 of cylinder 62, as the case may be. The cap 50 (or 75) is then applied and further disturbance of the apparatus is unnecessary until it is desired to change a tire in which event the process of removal is the reverse of that of application.

Two of the lock-type tire retaining lugs herein illustrated are preferred and are preferably located at diametrical points on the wheel. The advantage in utilizing two locking lugs is that the locking disks 37 (or 70) may require different "keys" thus providing an additional factor of safety in that a prospective thief will not very frequently have with him the particular combination of different keys 45 required for the removal of differently keyed disks from the same wheel. The matter of wheel balance is of little importance since the additional weight of the lugs is but a few ounces as compared with tires which weigh up to several hundred pounds.

Figures 6, 7:
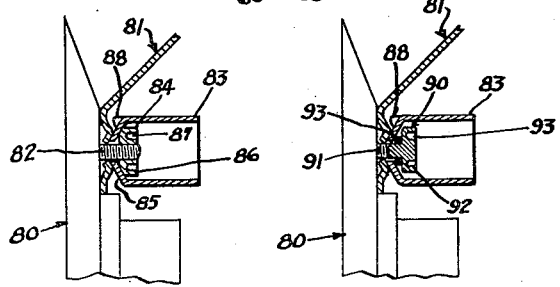
Figures 6 and 7 are fragmentary elevational views partly in section illustrating embodiments of the invention as applied to demountable automotive wheels.

In the modification illustrated in Figures 6 and 7, 80 generally designates a fragment of a usual hub and brake drum assembly, and 81 generally designates a demountable wheel which is held in place upon the hub by means of a plurality of cap screws which thread into the hub or by nuts operating on studs of the hub.

Figure 6 illustrates the type of wheel mounting having a plurality of fixed studs of which one such stud 82 is illustrated. The usual wheel nuts are applied to all but one or two of the studs and upon these there is mounted cup-shaped member 83 which is held in place by the keyed cylindrical nut 84. The cup 83 may be cone-shaped at the base 85, to fit the wheel nut recesses of the particular installation. Nut 84 is cylindrical and has a threaded central opening which may go all the way through or partly through nut 84, and the outer surface 86 is provided with a plurality of holes 87 spaced indiscriminately as described with reference to holes 40 of disk 37 and holes 72 of disk 70. A key of the type shown in Figure 2, having similarly spaced pins, is utilized in applying or removing the cylindrical nut 84.

Figure 7 is similar to Figure 6 except the wheel 81 and hub 80 are of the type which are held in place by cap screws. In this instance, cylinder 83 is held in place by a cap screw 90 having screw portion 91 and an integral disk like head 92. A space-filling washer 93 may be applied, as shown, if desired.

The disk head 92 is provided with a plurality of indiscriminately located "key" holes 93, which like holes 87, are of a size and are located to fit a particular "key" (Figure 2) for application and removal of the stud.

In both Figures 6 and 7, the deep cylindrical cup 83 fits closely around the cylindrical nut 84 (Figure 6) or stud head 92 (Figure 7) thus precluding turning of these members with pliers or pipewrench and render difficult the use of improvised wrenches or any attempt at loosening using a hammer and punch or chisel. Cylinder 83 may, if desired, be provided with an unsymmetrical tip 88 to engage a part of wheel 81 and thus prevent its rotation, the slight loosening of stud 92 or nut 84 by rotation of cup 83 being futile since cup 83, when freed, merely rotates and does not further loosen the nut or stud it protects. As the modern automobile usually has a hub cap enclosing all of the wheel nuts, no individual cap is required on cylinder 83, but where exposed, it may be capped as shown in Figure 1.

Many obvious variations may be made in the apparatus herein illustrated, described and claimed without departing from the spirit of the invention claimed.

I claim as my invention:

1. A device for obstructing theft of automotive tires comprising a lug having an aperture for receiving a holding bolt and a surface for receiving a lug nut to hold the lug in operative condition, said lug being provided with a deep cylindrical housing mounted on the lug in a position so as to form a wall around a lug nut when the latter is on a lug bolt and tightened against the lug, a disk for closing the cylindrical housing, said disk being held in the housing by a threaded connection, the axis of rotation of the disk on the threaded connection being substantially parallel with the axis of said cylindrical housing said disk being provided with a key surface for rotation with a key having a correspondingly keyed instrument for removal from the cylindrical housing.

2. A device for obstructing theft of automotive tires comprising an apertured lug, said lug being adapted to be mounted on a lug bolt and to be held in place by a lug nut, a deep cylindrical housing formed on the lug in a position so as to form a wall around the lug nut when the latter is tightened against the lug and a disk having a diameter to fit into the cylinder, said disk being centrally threaded to fit the lug bolt and provided with a key surface for rotation with a corresponding keyed instrument.

3. A device for obstructing theft of automotive tires from wheels where the tires are mounted on demountable rims which are in turn held in place on a wheel, clamping lugs mounted on lug bolts through the wheel, comprising a lug having a portion for wedging against the rim and holding the rim in place on the wheel and a portion circumscribing the lug bolt for receiving a lug nut, a deep cylindrical housing formed on the lug in a position so as to form a wall around the lug nut when the latter is tightened against the lug and a disk having a diameter to fit into the cylinder, said disk being centrally threaded to fit the lug bolt of the wheel and provided with a key surface for rotation with a correspondingly keyed instrument.

4. A device for obstructing theft of automotive tires comprising an aperture lug, said lug being adapted to be mounted on a bolt and to be held in place by a lug nut, a deep cylindrical housing formed on the lug in a position so as to form a wall around the lug nut when the latter is tightened against the lug, and a disk having a threaded edge, said cylindrical wall being correspondingly threaded whereby the disk may be threaded into the cylinder in a position to cover a lug nut therein, said disk being provided with a key surface for rotating the disk with a correspondingly keyed instrument.

5. A device for obstructing theft of automotive tires from wheels where the tires are mounted on rims which are in turn held in place on a wheel by clamping lugs mounted on lug bolts through the wheel, comprising a lug having a portion for engaging and wedging against the rim and a portion circumscribing the lug bolt for receiving a lug nut, a deep cylindrical housing formed on the lug in a position so as to form a wall around the lug nut when the latter is tightened against the lug, and a disk having a threaded edge, said cylindrical wall being correspondingly threaded whereby the disk may be threaded into the cylinder in a position to cover a lug nut therein, said disk being provided with a key surface for rotating the disk with a correspondingly keyed instrument.

6. A device for obstructing theft of automotive tires from wheels where the tires are mounted on rims which are in turn held in place on a wheel by clamping lugs mounted on lug bolts through the wheel, comprising a lug having a portion for engaging and wedging against the rim and a portion circumscribing the lug bolt for receiving a lug nut, a deep cylindrical housing formed on the lug in a position so as to constitute a wall around a lug nut when the latter is tightened against the lug, a disk having a threaded surface for holding the disk within the cylindrical wall in a position to cover a lug nut therein, said disk being provided with a key surface for rotating the key with a correspondingly keyed instrument, and a cover at the outer portion of the cylinder for excluding water and sediment therefrom.

7. A device for obstructing theft of automotive tires from wheels where the tires are mounted on rims which are in turn held in place on a wheel by clamping lugs mounted on lug bolts through the wheel, comprising a lug having a portion for engaging and wedging against the rim and a portion circumscribing the lug bolt for receiving a lug nut, a deep cylindrical housing formed integrally with the lug in a position so as to constitute a wall around a lug nut when the latter is tightened against the lug, a disk having a threaded edge, said cylindrical wall being correspondingly threaded whereby the disk may be threaded into the cylinder in a position to cover a lug nut therein, said disk being provided with a key surface for rotating the disk with a correspondingly keyed instrument, an end cover member, means fastening said cover to the end of the cylinder for excluding water and sediment therefrom.

8. A device of the type set forth in claim 7 wherein the lug is a standard wheel lug and the cylindrical wall is a section of pipe, the two being welded together into a unity.

9. A theft obstructing device for preventing removal of a retaining screw member comprising a deep cylindrical cup having an aperture through the bottom, said cup being adapted to be located with the screw member extending through the aperture into the cup and a retaining disk on the screw member, said disk having a diameter slightly smaller than the interior of the deep cylindrical cup, the sole means for retaining the disk in the deep cylindrical cup being a screw threaded connection the axis of which is substantially aligned with the axis of the cup said disk being provided with key surfaces on its exposed face for engagement by a fitted key member for turning the disk.

10. The apparatus set forth in claim 9 further characterized in that the key surfaces located in the exposed surface of the disk for engagement by a key having pins for insertion into the holes.

11. The apparatus set forth in claim 9 further characterized in that the disk is centrally threaded to fit on a screw threaded stud.

12. The apparatus set forth in claim 9 further characterized in that the disk member is the head of a threaded cap-screw and is permanently connected thereto for rotating the cap-screw.

13. The apparatus set forth in claim 9 further characterized in that the deep cylindrical member has a lug for engagement with another surface on the device, the theft of which is prevented, so as to prevent rotation of the deep cylindrical member.

HARRY JAFFA.